United States Patent Office 3,474,078
Patented Oct. 21, 1969

3,474,078
THERMOSETTING AMIDE-EPOXIDE COMPOSITIONS
Hugh A. Farber and John C. Safranski, Jr., Midland, Mich., assignors to The Dow Chemical Company, Midland, Mich., a corporation of Delaware
No Drawing. Filed Aug. 13, 1965, Ser. No. 479,655
Int. Cl. C08f 29/50; C08g 45/04
U.S. Cl. 260—80.72
8 Claims

ABSTRACT OF THE DISCLOSURE

This disclosure is concerned with non-aqueous thermosetting coating compositions which are composed of a polymeric reaction product of from 5 to 20 percent by weight of a polymerizable unsaturated carboxylic acid amide and from 5 to 20 percent by weight of a vinyl epoxide and from 90 to 60 percent by weight of a third monomer which may be a vinyl aromatic or aliphatic ester of acrylic acid said reaction product being dissolved in an organic solvent.

---

This invention relates to new thermosetting coating compositions. More particularly, it relates to thermosetting compositions comprising the condensation of vinyl monomers containing pendant epoxide and amide groups, with a vinyl diluent.

Thermosetting resins of amides and epoxides are known. Representative of the art is U.S. Patent 2,589,245, to Greenlee, which describes amide-epoxy compositions comprising the reaction products of organic carboxylic acid amides and polymeric polyethers of a dihydric phenol. U.S. Patent 2,928,811, to Belanger, teaches the curing of a glycidyl polyether of polyhydric phenols and alcohols with an amide selected from the group consisting of benzoguanamine and dicyandiamide. U.S. Patent 3,060,144, to Gaylord, describes thermosetting compositions comprising norbornene containing acrylic copolymers blended with alkylated acrylamide epoxide condensation products, wherein the epoxides consist of the reaction product of epichlorohydrin and Bisphenol A.

The thermosetting epoxide resins generally known to the art require a separate curing agent, that is, aliphatic and aromatic polyamines, to become cured thermoset films and coatings. In addition, most thermosetting resins require catalysts, as well as heat, to achieve a satisfactory cure. A disadvantage to a large proportion of thermosetting epoxide resins is their tendency to have a short pot life at room temperature when a curing agent is used to obtain a cure.

Therefore, to overcome these and other disadvantages, it has been found that thermosetting polymeric resins can be prepared containing pendant amide and epoxide groups distributed along vinyl backbones which are self-curing via cross-linking at elevated temperatures to form tough, hard, solvent-resistant films and coatings.

The thermosetting amide-epoxide compositions of the present invention are conveniently prepared by reacting together: (1) a polymerizable unsaturated carboxylic acid amide having the general structure

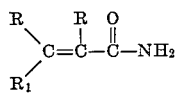

wherein R, R$_1$, and R$_2$ are independently selected from the group consisting of hydrogen, 2 to 8 C chain lower alkyl, carboxamide and aryl; (2) a vinyl epoxide having the general structure

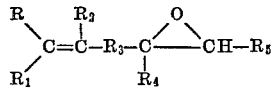

wherein R, R$_1$, R$_2$, R$_4$ and R$_5$ are independently selected from the group consisting of hydrogen, 2 to 8 C chain lower alkyl and aryl, where R$_3$ is arylene; and (3) a vinyl monomer selected from the group consisting of vinyl aromatics and aliphatic esters of acrylic acid. The reaction is preferably carried out in the presence of a free radical catalyst such as azo-bis-isobutyronitrile.

In one embodiment of the present invention's preparation of the amide-epoxide interpolymer resins, a polymerizable unsaturated carboxylic acid amide is polymerized with one or more ethylenically unsaturated monomers and a vinyl monoepoxide. It is believed that the resulting polymer has the following approximate structure when, for illustrative purposes, an acrylamide is reacted with an arylene (Ar) substituted monoepoxide and a vinyl monomer polymerizable therewith:

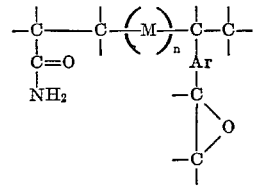

wherein M represents a unit of a vinyl monomer polymerizable with an unsaturated carboxylic acid amide and a vinyl monoepoxide, and $n$ represents a whole number greater than 1. For example, if styrene were utilized as the vinyl monomer, M would represent the unit:

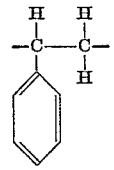

While either acrylamide or methacrylamide is preferred for use in forming the interpolymer, any unsaturated carboxylic acid amide can be employed, such as alpha-ethyl acrylamide, crotonamide, and amides of maleic and fumaric acid, and other amides of alpha-beta-ethylenically unsaturated carboxylic acid containing up to about 10 carbon atoms, and sulfonamides, such as sulfonamido-styrene.

Desirable vinyl epoxides include monomeric epoxides having an ethylenically unsaturated double bond and a single epoxide group and can be substituted with lower alkyls having up to 8 carbon atoms. There can be either an alkylene or an arylene radical positioned between the epoxide group and the vinyl portion of the molecule. Preferably, the epoxide compound is divinyl benzene monoepoxide or m-diisopropenylbenzene monoepoxide.

It is desirable that the interpolymer contains from about 5 to 20 percent of the carboxylic acid amide. Preferably the vinyl epoxide content should be about the same percentage of the total interpolymer. The exact amount of each monomer depends on the particular end use desired of the film-forming interpolymer composition. Most preferably, to reduce the cross-linking density of the polymeric system and to increase the flexibility of the resulting polymer, about 10 to 15 percent, based on total polymer of each of the carboxylic acid amide and vinyl epoxide is used in the preparation of the interpolymer of the present invention. The vinyl monomer used to reduce cross-linking density comprises the remainder of the polymer systems, and is preferably styrene or butyl acrylate.

It is ordinarily preferred to use solvents and catalysts in preparing the amide-epoxide polymers. Useful solvents include toluene, xylene, ketones, dioxane, dimethyl formamide, and the like. Dimethyl formamide is the preferred solvent used. The preferred catalyst is azo-bis-isobutyronitrile, used in typical catalytic amounts.

A preferred method of preparing the amide-epoxide-vinyl monomer interpolymer is to mix together the monomers in the presence of the desired catalyst, in a solvent, and heating. Another method of preparing the amide-epoxide-vinyl monomer interpolymer is to prepare first the copolymers of the ethylenically unsaturated carboxylic acid amide with a vinyl monomer, such as styrene, and of a vinyl epoxide with the vinyl monomer. Both methods of preparation are suitable for the production of the interpolymer compositions of the present invention. Typically, a 1 part m-diisopropenylbenzene mono-epoxide-2 parts styrene copolymer can be prepared by solution polymerization in dimethyl formamide using azo-bis-isobutyronitrile catalysis. The polymerization is carried out using standard solution polymerization procedures. Methods for the preparation of various copolymers of acrylamide with other vinyl monomers, for example, styrene and the acrylates, are well known in the chemical art. For the purposes of the present invention any conventional method of preparation of these copolymers is suitable.

Hard, solvent-resistant films of the cured interpolymer are conveniently prepared by casting a film of the polymer or polymers, which are preferably dissolved in a solvent as described above, onto a desirable surface, then baking the film at about 300° to 350° F. for about 0.5 to 1 hour. Films prepared in this manner are generally clear, glossy, well adhered to the casting surface, solvent-resistant, and have a pencil hardness of from about 6H to 9H.

The following examples illustrated in detail the preparation of the resinous compositions and resultant cured films of this invention. The examples are not intended to limit the invention, however, for there are, of course, numerous possible variations and modifications.

EXAMPLE 1

A Carius Tube was charged with a mixture comprising:

| | Grams |
|---|---|
| Styrene | 14 |
| Acrylamide | 3 |
| m-(1,2-epoxy-1-methylethyl)-alpha-methyl styrene | 3 |
| Azo-bis-isobutyronitrile (catalyst) | 0.4 |
| Dimethyl formamide (solvent) | 8.0 |

The tube was then cooled to −70° C., evacuated and sealed while still evacuated. The mixture was heated at 60° C. for forty-two hours, yielding a very viscous, nearly solid solution. Dilution with dimethyl formamide, followed by addition of this solution to methanol while stirring yielded 12.5 grams of white powdery solid. Removal of a small sample before precipitation and removal of all volatiles up to about 400° F. indicated approximately 77 percent conversion.

The interpolymer contains about 15 percent each of the amide and epoxide, and about 70 percent of styrene. The prepared sample was dissolved at the 15 percent solids level in toluene and cast as films 0.75 mil and 1.5 mils thick on Bonderite "100" steel panels. The films were then baked at about 300° F. for 1 hour. The resultant baked film had a pencil hardness of about 9H, was undissolved by a hard, 5 second acetone rub, and although somewhat brittle, the film was well-adhered after bending at 180° about a ¼ inch diameter rod.

EXAMPLE 2

Curing of a mixture of amide copolymer and epoxide copolymer occurs under conditions similar to those described in Example 1, above. Ten grams of a dimethyl formamide solution of 15 percent acrylamide —85 percent styrene copolymer (having 30 percent solids and 0.0063 equivalents of $-CONH_2$ group) was mixed with 1.7 grams of solid copolymer comprising m-(1,2-epoxy-1-methylethyl)-alpha-methyl styrene and styrene (having 0.0065 equivalents epoxide) and 6.0 grams of dimethyl formamide to aid solution. The resulting clear solution was applied to a steel panel of Bonderite "100" steel, baked at 350° F. for 30 minutes. The resultant film had a hardness of 6H pencil, was well-adhered and exhibited only slightly less solvent resistance than the film of Example 1.

A portion of the polymer in solution was air dried at 25° C. on a similar Bonderite "100" steel panel. Whereas the baked film was very glossy and smooth and was affected only after a hard, 5 second rub with acetone, the 25° C. dried film was non-glossy, rough and dissolved instantly when acetone was contacted therewith. Infra red analyses of films dried in air at 25° C. and of baked films indicated appearance of the secondary amide band at 6.5 microns and the hydroxyl band at 2.85 microns in the baked film, while neither were present in the air-dried film.

The properties evidenced in the above examples illustrate the usefulness of these film-forming thermosetting polymers as varnishes, paints, protective coatings, and the like.

We claim:

1. A non-aqueous thermosetting coating composition consisting essentially of an organic solvent having dissolved therein thermosetting polymeric resins containing pendant amide and epoxide groups distributed along vinyl backbones which comprise the reaction products of (1) from about 5 to 20 percent of a polymerizable unsaturated carboxylic acid amide having the general structure

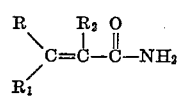

wherein R, $R_1$ and $R_2$ are independently selected from the group consisting of hydrogen, 2–8 C chain lower alkyl and aryl; (2) from about 5 to 20 percent of a vinyl epoxide having the general structure

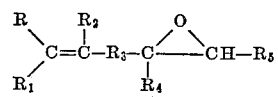

wherein R, $R_1$, $R_2$, $R_4$ and $R_5$ are independently selected from the group consisting of hydrogen 2–8 C chain lower alkyl and aryl where $R_{3,,}$ is arylene; and (3) from about 90 to 60 percent of a vinyl monomer selected from the group consisting of vinyl aromatics and aliphatic esters of acrylic acid, the reaction being carried out in the presence of a free radical catalyst.

2. The polymeric resins of claim 1 wherein the polymerizable unsaturated carboxylic acid amide is acrylamide.

3. The polymeric resins of claim 1 wherein the polymerizable unsaturated carboxylic acid amide is methacrylamide.

4. The polymeric resins of claim 1 wherein the vinyl epoxide is divinyl benzene monoepoxide.

5. The polymeric resins of claim 1 wherein the vinyl epoxide is m-diisopropenylbenzene monoepoxide.

6. The polymeric resins of claim 1 wherein the vinyl monomer selected from the group consisting of vinyl aromatics and aliphatic esters of acrylic acid is styrene.

7. The polymeric resin of claim 1 wherein the vinyl monomer selected from the group consisting of vinyl aromatics and aliphatic esters of acrylic acid is butyl acrylate.

8. The polymeric resins of claim 1 wherein the free radical catalyst is azo-bis-isobutyronitrile.

References Cited
UNITED STATES PATENTS 3,201,497  8/1965  Heino _____ 260—837
3,252,931  5/1966  Pfluger et al. _____ 260—27

JOSEPH L. SCHOFER, Primary Examiner
S. M. LEVIN, Assistant Examiner

U.S. Cl. X.R.
117—132; 260—30.4, 32.6, 32.8, 33.6, 88.1 830